US008719804B2

(12) United States Patent
Jain (10) Patent No.: US 8,719,804 B2
(45) Date of Patent: May 6, 2014

(54) MANAGING RUNTIME EXECUTION OF APPLICATIONS ON CLOUD COMPUTING SYSTEMS (75) Inventor: Navendu Jain, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 613 days.

(21) Appl. No.: 12/774,203

(22) Filed: May 5, 2010

(65) Prior Publication Data

US 2011/0276951 A1 Nov. 10, 2011

(51) Int. Cl.
G06F 9/44 (2006.01)
G06F 9/45 (2006.01)

(52) U.S. Cl.
USPC ............ 717/140; 717/117; 717/120; 717/127

(58) Field of Classification Search
None
See application file for complete search history.

(56) References Cited

U.S. PATENT DOCUMENTS

| | | | | |
|---|---|---|---|---|
| 6,880,002 | B2 * | 4/2005 | Hirschfeld et al. | 709/223 |
| 6,966,005 | B2 | 11/2005 | Bohrer | |
| 7,155,623 | B2 | 12/2006 | Lefurgy | |
| 7,590,976 | B2 * | 9/2009 | Kawai et al. | 717/140 |
| 7,797,684 | B2 * | 9/2010 | Prakash | 717/127 |
| 8,151,252 | B2 * | 4/2012 | Song et al. | 717/140 |
| 8,296,763 | B1 * | 10/2012 | Peercy et al. | 718/1 |
| 8,316,125 | B2 * | 11/2012 | DeHaan | 709/224 |
| 2002/0092004 | A1 * | 7/2002 | Lee et al. | 717/140 |
| 2004/0268309 | A1 * | 12/2004 | Grover et al. | 717/120 |
| 2005/0246686 | A1 * | 11/2005 | Seshadri et al. | 717/117 |
| 2006/0070030 | A1 * | 3/2006 | Laborczfalvi et al. | 717/120 |
| 2006/0101413 | A1 * | 5/2006 | Kinno et al. | 717/127 |
| 2006/0236307 | A1 * | 10/2006 | Debruin et al. | 717/117 |
| 2006/0265689 | A1 * | 11/2006 | Kuznetsov et al. | 717/117 |
| 2007/0061783 | A1 * | 3/2007 | Prakash | 717/127 |
| 2007/0168962 | A1 * | 7/2007 | Heinke et al. | 717/120 |
| 2008/0127130 | A1 * | 5/2008 | Carbone et al. | 717/140 |
| 2008/0155517 | A1 * | 6/2008 | Yan et al. | 717/140 |
| 2008/0167756 | A1 | 7/2008 | Golden | |
| 2008/0178029 | A1 | 7/2008 | McGrane | |
| 2008/0216057 | A1 * | 9/2008 | Nakagawa | 717/127 |
| 2008/0282231 | A1 * | 11/2008 | R et al. | 717/127 |
| 2009/0106571 | A1 | 4/2009 | Low | |
| 2009/0182955 | A1 * | 7/2009 | Cherukuri | 711/141 |
| 2009/0265568 | A1 | 10/2009 | Jackson | |

(Continued)

OTHER PUBLICATIONS

B. Rochwerger, The Reservoir model and architecture for open federated cloud computing, 2009, pp. 2-9.*

(Continued)

Primary Examiner — Thuy Dao
Assistant Examiner — Mongbao Nguyen
(74) Attorney, Agent, or Firm — Dan Choi; Carole Boelitz; Micky Minhas (57) ABSTRACT Instances of a same application execute on different respective hosts in a cloud computing environment. Instances of a monitor application are distributed to concurrently execute with each application instance on a host in the cloud environment, which provides user access to the application instances. The monitor application may be generated from a specification, which may define properties of the application/cloud to monitor and rules based on the properties. Each rule may have one or more conditions. Each monitor instance running on a host, monitors execution of the corresponding application instance on that host by obtaining from the host information regarding values of properties on the host per the application instance. Each monitor instance may evaluate the local host information or aggregate information collected from hosts running other instances of the monitor application, to repeatedly determine whether a rule condition has been violated. On violation, a user-specified handler is triggered.

19 Claims, 8 Drawing Sheets

(56) References Cited

U.S. PATENT DOCUMENTS

| | | | | |
|---|---|---|---|---|
| 2010/0088150 | A1* | 4/2010 | Mazhar et al. | 705/10 |
| 2011/0126197 | A1* | 5/2011 | Larsen et al. | 718/1 |
| 2011/0138047 | A1* | 6/2011 | Brown et al. | 709/226 |
| 2011/0154239 | A1* | 6/2011 | Dheap et al. | 715/771 |
| 2011/0154302 | A1* | 6/2011 | Balko et al. | 717/140 |

OTHER PUBLICATIONS

Trieu C. Chieu, Dynamic Scaling of Web Application in a Virtual Cloud Computing Environment, 2009, pp. 281-284.*
Bhaskar Prasad Rimal, A Taxonomy and Survey of Cloud Computing Systems, 2009, pp. 45-47.*
Torres et al.; Inferring undesirable behavior from p2p traffic analysis; In SIGMETRICS, 2009.
Urgaonkar et al.; Agile dynamic provisioning of multi-tier Internet applications; ACM Trans. Auton. Adapt. Syst., 3(1):1-39, 2008.
VanRenesse et al.; Astrolabe: A Robust and Scalable Technology for Distributed System Monitoring, Management, and Data Mining; TOCS, 2003.
Yabandeh et al.; Crystalball: predicting and preventing inconsistencies in deployed distributed systems; In NSDI, 2009.
Yin et al.; Rhizoma: A runtime for self-deploying, self-managing overlays; In ACM Middleware, 2009.
Yuan et al.; Automated known problem diagnosis with event traces; SIGOPS Oper. Syst. Rev., 40(4), 2006.
Khan et al.; Energy Efficient Resource Allocation in Distributed Computing Systems; World Academy of Science, Engineering and Technology 56 2009.
Ge et al.; CPU MISER: A Performance-Directed, Run-Time System for Power-Aware Clusters; Published Date: Jun. 22, 2007; Parallel Processing, 2007. ICPP 2007. International Conference Sep. 10-14, 2007 pp. 18-18.
Stoess et al.; Energy Management for Hypervisor-Based Virtual Machines; 2007 USENIX Annual Technical Conference pp. 1-14 of the Proceedings.
Kephart et al.; Coordinating Multiple Autonomic Managers to Achieve Specified Power-Performance Tradeoffs; ICAC '07 Proceedings of the Fourth International Conference on Autonomic Computing.
Felter et al.; A Performance-Conserving Approach for Reducing Peak Power Consumption in Server Systems; ICS'05, Jun. 20-22, Boston, MA, USA.
[MC-DRT]:Distributed Routing Table (DRT)Version 1.0 Specification; Date Published: Friday, Jun. 10, 2011; http://msdn.microsoft.com/en-us/library/dd356353%28PROT.10%29.aspx.
Performance Counter Class System; Date Published: 2011; http://msdn.microsoft.com/en-us/library/system.diagnostics.performancecounter.aspx.
How to Use Event Tracing for Windows for Performance Analysis; Date Published: 2005; http://download.microsoft.com/download/f/0/5/f05a42ce-575b-4c60-82d6-208d3754b2d6/EventTrace_PerfAnalysis.ppt.
Event Tracing for Windows (ETW); Date Published May 27, 2005.
Windows Filtering Platform; Date Published: Sep. 13, 2011; http://www.microsoft.com/whdc/device/network/WFP.mspx.
Adams; Distributed system management: PlanetLab incidents and management tools; Technical Report PDN-03-015, PlanetLab Consortium, 2003.
Amazon Elastic Compute Cloud (Amazon EC2); Date Published: Sep. 13, 2011; http://aws.amazon.com/ec2.
Anderson et al.; Learning from PlanetLab; In WORLDS, 2006.
WindowsAzure; Date Published: 2011; http://www.microsoft.com/windowsazure.
Bhatia et al.; Lightweight, High-Resolution Monitoring for Troubleshooting Production Systems; In OSDI, 2008.
Bohrer et al.; The case for power management in web servers; In R. Graybill and R. Melhem, editors, Power Aware Computing. 2002.
Castro et al.; Scribe: A large-scale and decentralised application-level multicast infrastructure; In IEEE JSAC, 2002.

Cesini et al.; WMSMonitor: A monitoring tool for workload and job lifecycle in Grids; In Proceedings of the IEEE/ACM International Conference on Grid Computing (GRID), 2008.
Chen et al.; Monitoring oriented programming—a project overview; In ICICIS, 2009.
Chen et al.; Pinpoint: Problem determination in large, dynamic Internet services; In Proc. of DSN, 2002.
Cohen et al.; Correlating instrumentation data to system states: a building block for automated diagnosis and control; In OSDI, 2004.
Dao et al.; Live Debugging of Distributed Systems; In Proc. of CC, 2009.
Downey; Using pathchar to estimate Internet link characteristics; In ACM SIGCOMM, 1999.
Eichenhardt et al.; User- and job-centric monitoring: Analysing and presenting large amounts of monitoring data; In Proceedings of the IEEE/ACM International Conference on Grid Computing (GRID), 2008.
Fan et al.; Power provisioning for a warehouse-sized computer; In Proceedings of the International Symposium on Computer Architecture (ISCA), Jun. 2007.
Feng et al.; Resource usage policy expression and enforcement in grid computing; In Proceedings of the IEEE/ACM International Conference on Grid Computing (GRID), 2007.
Galstad; Nagios; 1999; http://www.nagios.org.
Ghanbari et al.; SelfTalk for Dena: Query Language and Runtime Support for Evaluating System Behavior; In HotStorage, 2009.
Haeberlen et al.; PeerReview: Practical accountability for distributed systems; In SOSP, 2007.
Ioannidis et al.; Design and Implementation of Virtual Private Services; In WETICE, 2003.
Jain et al.; A Wakeup Call for Internet Monitoring Systems: The Case for Distributed Triggers; In HotNets, 2004.
Jain et al.; STAR: Self tuning aggregation for scalable monitoring; In VLDB, 2007.
Jain et al.; Network Imprecision: A New Consistency Metric for Scalable Monitoring; In OSDI, 2008.
Kansai et al.; Virtual machine power metering and provisioning; In Concurrently in submission to the ACM Symposium on Cloud Computing (SOCC 2010).
Kostic et al.; Bullet: high bandwidth data dissemination using an overlay mesh; In SOSP, 2003.
Lefurgy et al.; Server-level power control; In Fourth International Conference on Autonomic Computing (ICAC), p. 4, 2007.
Legrand et al.; Monitoring and control of large systems with MonALISA; Communications of the ACM, 52:49-55, 2009.
Liu et al.; D3s: debugging deployed distributed systems; In NSDI, 2008.
Madden et al.; TAG: a Tiny AGgregation Service for Ad-Hoc Sensor Networks; In OSDI, 2002.
Nandi et al.; SAAR: A shared control plane for overlay multicast; In NSDI, 2007.
Nathuji et al.; Feedback driven qos-aware power budgeting for virtualized servers; In Fourth International Workshop on Feedback Control; Implementation and Design in Computing Systems and Networks (FeBID), Apr. 2009.
Park et al.; CoMon: a mostly-scalable monitoring system for PlanetLab; SIGOPS Oper. Syst. Rev., 40(1), 2006.
Planetlab; Date Published: 2007; http://www.planet-lab.org.
Raghavan et al.; Cloud control with distributed rate limiting; In SIGCOMM, 2007.
Raj et al.; Resource management for isolation enhanced cloud services; In Proceedings of the Cloud Computing Security Workshop (CCSW), 2009.
Reynolds et al.; Pip: Detecting the Unexpected in Distributed Systems; In NSDI, 2006.
Rhea et al.; Handling churn in a DHT; In USENIX Annual Technical Conference, 2004.
Rowstron et al.; Pastry: Scalable, Distributed Object Location and Routing for Large-scale Peer-to-peer Systems; In Middleware, 2001.
Sherwood et al.; Touring the Internet in a TCP Sidecar; In Internet Measurement Conference, 2006.
Singh et al.; Using queries for distributed monitoring and forensics; SIGOPS Oper. Syst. Rev., 40(4), 2006.

* cited by examiner

```
<specification>

...

<sensor name="powerUsage">
  <sensortype>power_watts</sensortype>
  <frequency>0.2</frequency>
  <condition>value=avg</condition>
  <condition>timespan=30</condition>
</sensor>

<sensor name="Requests_CDN">
  <sensortype>num_requests</sensortype>
  <frequency>0.1</frequency>
  <condition>app=CDNApp</condition>
  <condition>value=avg</condition>
  <condition>timespan=60</condition>
</sensor>

<sensor name="Bandwidth_APP">
  <sensortype>etw_outbandwidth_bytes</sensortype>
  <frequency>0.1</frequency>
  <condition>app=ANY</condition>
  </sensor>

<sensor name="InstancesUp_AppFE">
  <sensortype>processes_num</sensortype>
  <frequency>0.1</frequency>
  <condition>app=AppFE</condition>
</sensor>

...

</specification>
```

162 — <sensor name="powerUsage">
164 — <frequency>0.2</frequency>

FIG. 3

```xml
<specification>

<rule name="PowerCap">
    <frequency>0.1</frequency>
    <nodeset type="IP">10.0.0.1,10.0.0.2, 10.0.0.3,10.0.0.4,10.0.0.5</nodeset>
    <condition>SUM(powerUsage) gt 1KW</condition>
    <violationhandler>
        <type>log</type>
        <argument>Power capacity overload!</argument>
    </violationhandler>
</rule>

<rule name="LoadBalance_CDNApp">
    <frequency>0.1</frequency>
    <condition>MAX(Requests_CDN)-MIN(Requests_CDN) gt
                    0.2*MAX(Requests_CDN)</condition>
    <violationhandler>
        <type>log</type>
        <argument>Max vs. min load exceeds 20%!</argument>
    </violationhandler>
</rule>

<rule name="DDoS">
    <frequency>0.1</frequency>
    <condition>SUM(GROUP-BY(Bandwidth_APP, APP)) gt 100MB </condition>
    <violationhandler>
        <type>log</type>
        <argument>Heavy hitters; possible DDoS!</argument>
    </violationhandler>
</rule>

<rule name="MaintainFrontEndInstances">
    <frequency>0.1</frequency>
    <condition>SUM(InstancesUp_AppFE) lt 200</condition>
    <violationhandler>
        <type>binary</type>
        <argument>c:\bin\start_new_instances</argument>
        <argument>200 - SUM(InstancesUp_AppFE)</argument>
    </violationhandler>
</rule>

</specification>
```

```
//TestPowerCapacityOverload()

double totalpower = hosts.Sum(x => x.PowerUsage);
        if (totalpower > 1.0)
           Console.WriteLine("Power overloaded:"+totalpower);

//TestLoadBalance()

bool checkBalance = (hosts.Max(x => x.ReqestsCDN) - hosts.Min(x => x.ReqestsCDN)) >
(0.2 * hosts.Max(x => x.ReqestsCDN));

if (checkBalance)
           Console.WriteLine("Not load balanced");
        else
           Console.WriteLine("Load balanced");

//TestDetectDDoS()
        var sortedByAPP = hosts.GroupBy(x => x.APP);
        var ddosAlert = from e in sortedByAPP where e.Sum(x => x.BandwidthAPP) > 100 select
e.Key;
        Console.WriteLine("The following applications could be under DDoS attack:");
        foreach (var app in ddosAlert)
        {
           Console.WriteLine(app);
        }

//TestRequireNewInstance()

int totalinstances = hosts.Sum(x => x.InstancesUpAppFE);
        Console.WriteLine("Launch number of new instances:{0}", (200 - totalinstances));
           launchNewInstances(200 - totalinstances);

//TestSpamDetection()

var query =
           from pkt in packets
           group pkt by pkt.srcIP
           into sdPairs
           select new
           {
             Key = sdPairs.Key,
             Cnt = sdPairs.Select(x=>x.dstIP).Distinct().Count(),
           };
        foreach (var row in query.OrderBy(x=>x.Key))
        {
           Console.WriteLine("{0}: {1}", row.Key, row.Cnt);
        }
```

MANAGING RUNTIME EXECUTION OF APPLICATIONS ON CLOUD COMPUTING SYSTEMS

BACKGROUND

Cloud hosting of applications has become a cost-effective choice for developers to run applications, in particular, web-based applications and services. Cloud hosting infrastructures such as Microsoft's Windows Azure Platform, GoGrid, ElasticHosts, Mosso, and Amazon's Elastic Compute Cloud are just a few examples of cloud and utility computing platforms. By leveraging virtualization, economies of scale, resource time-sharing, and on-demand allocation of servers to different services (i.e., dynamic growing and shrinking of hosted application instances), cloud computing infrastructures provide cost-effective, fast deployment, and flexible alternatives to host services, in contrast to dedicated IT clusters. However, these infrastructures or platforms introduce new challenges for service developers and cloud operators. Developers run their applications on servers and networks they cannot directly observe or control and operators host black-box applications developed by external entities that might not be trusted. As a result, it is often difficult for both developers and cloud administrators to determine if application runtime errors are due to software bugs, inadequate resources available to applications, or platform outages, etc.

To elaborate, it is difficult for users and developers to observe the execution of their applications and check for safety (i.e., correctness of application state and operations) and liveness conditions (i.e., a concurrent application's ability to execute in a timely manner), at runtime. For example, it may not be possible, with existing cloud platforms, for application developers to identify software bugs and vulnerabilities (e.g., memory leaks and zombie processes), to reduce overhead (e.g., CPU and bandwidth), to maintain service availability, to improve performance, etc., without observing the runtime execution of their applications on these platforms. It has also been difficult for developers to safeguard application performance and availability against problems in the hosting platform such as misconfigured servers, network outages, or lack of sufficient resources available to applications during their execution on the cloud platform. Cloud operators also have difficulties. Operators may not be able to ensure that hosted applications are allocated sufficient resources to meet their specified Service-Level Agreement (SLA), that they do not interfere with other applications sharing common resources such as memory bandwidth and network, and that customer applications, either inadvertently or maliciously, don't abuse the hosting infrastructure (e.g., application instances acting as botnets for sending SIP attacks, spam or sending distributed denial-of-service (DDoS) attacks to internal or external sites), among other things.

Currently, there is a lack of adequate solutions for these challenges. Developers may take the approach of building cloud applications by programming the behavior of individual nodes at a low-level while attempting to achieve high-level global properties of the application. For debugging, developers may simply print to log files, which may allow them to observe local state and behavior at individual nodes, but which may not allow them to check global behaviors of the application and cloud computing infrastructure such as those relating to load balancing and fault tolerance. Furthermore, debugging is used for offline analysis and may not provide insight or control over global properties of the application and the cloud computing infrastructure, which may need to be continuously evaluated and enforced as an application executes on the cloud platform.

Some cloud platforms monitor performance counters at servers and log the counters to a database for post-mortem analysis. Watchdog processes may be installed on internal and external sites to periodically check the availability of individual application instances in a cloud. Management systems may provide automatic scaling of applications based on input workloads but do not provide techniques to protect the infrastructure from misbehaving applications. As a result, these approaches may be prone to errors, may exhibit delayed response to critical events, and may not guarantee desired performance and availability of hosted applications as well as of the cloud platform, among other factors.

Techniques related to managing cloud hosted applications are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

Instances of a same application execute on different respective hosts in a cloud computing environment. Instances of a runtime observer or monitor application are distributed to concurrently execute either with each application instance or a subset of application instances, without affecting the functioning of the application instance(s) being observed. Further, instances of a monitor application may also concurrently execute with cloud infrastructure services such as authentication service and domain name service (DNS), and software running on the cloud platform hardware equipment such as load balancers and network switches. The monitor application may be generated from a specification of the application as well as the runtime properties and characteristics of the cloud computing infrastructure. The specification may define properties of the application and the infrastructure that are to be monitored and rules based on the properties. Each rule may have one or more conditions. Each paired application instance and monitor instance execute concurrently on a host in the cloud computing environment, which provides access to the application instances to users. Each monitor instance running on a host with an application instance monitors execution of the corresponding application instance by obtaining runtime properties from the host, for example regarding usage of resources on the host by the application instance, and may also monitor execution of other application instances sharing common resources on that host, physical host information and its performance metrics such as available memory, and properties and performance metrics exported by that application instance and if needed, by other application instances hosted on that host. Each of the monitor applications may evaluate the local host information or aggregate information collected from hosts running other instances of the monitor application, and runtime properties of the infrastructure to repeatedly evaluate whether a rule condition in the specification has been violated.

Many of the attendant features will be explained below with reference to the following detailed description considered in connection with the accompanying drawings.

BRIEF DESCRIPTION OF THE DRAWINGS

The present description will be better understood from the following detailed description read in light of the accompa

DETAILED DESCRIPTION

Overview

Embodiments for managing cloud applications described below may involve various goals, including, for example, specification of applications, specification of properties and characteristics of cloud computing infrastructure, cloud-wide monitoring of application and system behavior and footprint related to the properties, and enforcing desired application and system behavior. Techniques related to these goals will be described briefly next, followed by an overview of an example system for accomplishing the techniques, followed then by sections corresponding to the techniques.

First, operators and developers/programmers (users) may form an abstract specification of high-level properties of an application and the cloud computing infrastructure without concern for the application's underlying implementation and of the cloud computing infrastructure. This specification may be simple, concise, and may abstract away low-level details of the application, for example, when the properties are externally observable by a system hosting the application (e.g., resource footprint properties). The properties specification may describe application properties both locally in terms of individual components and nodes as well as globally in terms of aggregates of the application running across a given cloud (e.g., across geo-distributed data centers). The specification may be considered abstract in so far as details of the specification may not depend on particular implementation of the particular application or the application itself. For example, a same specification may be used for two different applications; the properties, rules, etc. of the specification may apply equally to any arbitrary application.

To specify high-level global properties, two constructs may be included in specifications: sensors and rules. A sensor (virtual, not physical) defines a measurement interface to export observations about an application's resource footprint (e.g., bandwidth, CPU, memory, I/O reads and writes), network properties (e.g., network delay, loss rate), and system characteristics (e.g., power usage). A rule may include a condition (e.g., a Boolean expression) or multiple conditions on sensor outputs, the rule defining a high-level property on application and system behavior (e.g., load balancing) and communication Service-Level Agreements (SLAs) (e.g., "an instant messaging service can send at most 5 k requests per second to an authentication service"). Developers and operators use these constructs in a high-level language (e.g., XML and LINQ) to specify desired properties. After a specification is constructed, it may be compiled to generate/synthesize runtime observers or monitors that run along with application instances. That is, each instance of an application on a host may have an accompanying monitor concurrently running on the host, but without affecting the functioning of the application instance being observed. In other words, the runtime monitor acts as a executional watchdog for applications and the cloud computing infrastructure.

Second, runtime monitoring may be scaled to large systems in ways that may incur a low overhead, deliver results in near real-time, and are robust to node and network failures. To achieve system-wide monitoring, techniques may be combined to build a distributed information aggregation plane. Multiple Scribe-like aggregation trees may be used on top of a peer-to-peer (P2P) overlay. Scalability techniques such as arithmetic filtering and temporal batching may be used to reduce the monitoring overhead. The output of runtime monitors running at each node may be aggregated in a scalable manner to compute a global system view of an application and of the cloud computing infrastructure.

Third, a broad range of recovery actions and enforcement techniques may be used to control dynamic application behavior and system behavior in user-defined ways. That is, to enforce desired application behavior and system behavior at runtime, the mechanism of enforcement is separated from application-specific policy for controlling the application behavior. For example, if an application exceeds its specified resource usage, then enforcement may involve (a) sending an email/SMS notification or alert to the developer or cloud operator, (b) logging an error in a database, (c) terminating the running application instances using a user-provided or system-provided security key, or (d) triggering a resource control mechanism (e.g., CPU throttling for power capping). Example enforcement mechanisms of cloud hosted applications and the system will be described in detail later.

System Overview

Figure 1:
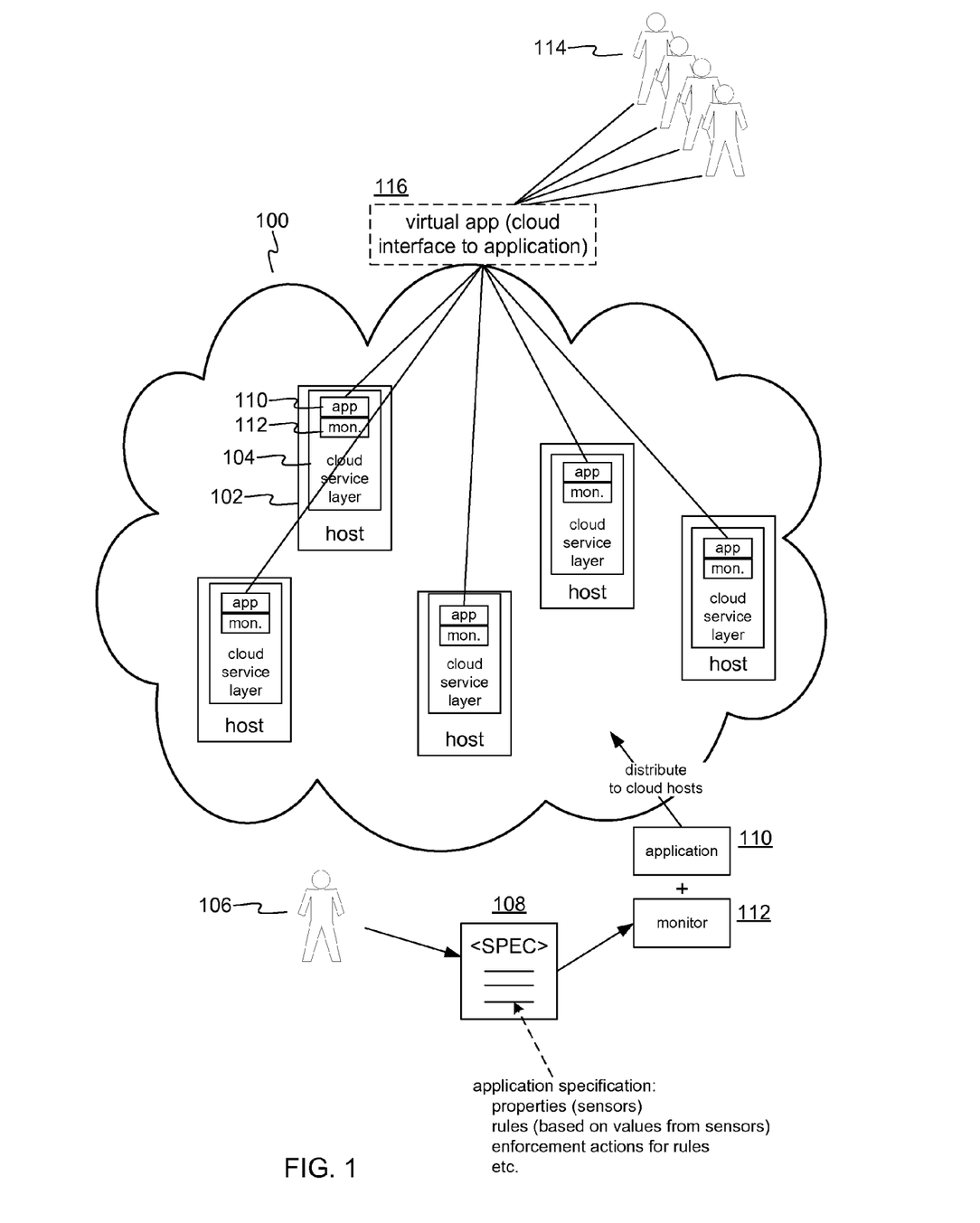
- FIG. 1 shows a system for cloud application management.

FIG. 1 shows a system for cloud application management. A cloud infrastructure 100 is shown, which may be any of the variety mentioned in the Background or similar cloud infrastructures (sometimes referred to as service-oriented architectures, etc.). The cloud infrastructure 100 includes a number of servers or hosts 102, which may be organized in clusters, racks, containers, colos, data centers, geographically disperse facilities, etc., in communication via a variety of types of networks, and organized and managed with some type of cloud infrastructure software (e.g., Microsoft Azure, Amazon EC2, Google AppEngine, or the like). Hosts 102 are typical computers with storage, memory, processor(s), network interfaces, operating systems, and other known components. Each host 102 includes some cloud service layer module 104 through which host 102 participates in the cloud infrastructure 100, is managed by the cloud infrastructure 100, hosts various user applications, etc. The cloud service layer module 104 may additionally provide a virtualization layer or environment such as Windows Hyper-V or Xen Virtual Machine Monitor (VMM) where individual applications are hosted in virtual machines (VMs) each running a guest operating system and VMs, in turn, hosted on top of the hypervisor or VMM on the physical host 102. Cloud infrastructure 100 may manage an application by, among other things, dynamically adjusting which hosts 102 or which VMs in the cloud service layer 104 are currently hosting the application 110, for example by balancing load, deactivating failing hosts 102 or VMs in the cloud service layer 104, increasing the number of hosts 102 or VMs in the cloud service layer 104 hosting the application 110 as load increases, migrating the application instance or VMs hosting the application instance in the cloud service layer 104 from one host 102 to another host 102 (VMs and hosts may be considered equivalent for purposes of hosting), and dynamically adjusting resource allocation (e.g., control network bandwidth) to application, VMs, or the physical host, among other things. The cloud infrastructure 100 may continuously adjust which hosts 102 or VMs in the cloud service layer 104 are hosting or currently executing instances of the application 110 transparently to external users 114 using the application 110.

Described chronologically from various users' perspectives, one or more users 106 (cloud administrator, developer, etc.) author a specification 108. The specification 108 describes various properties for application 110 (e.g., current CPU usage) and cloud computing infrastructure 100 (e.g., network bandwidth between servers), as well as rules governing behavior of the application 110 (e.g., CPU usage<20%) and cloud computing infrastructure 100 (e.g., inter-node delay<1 ms), and recovery and enforcement actions to be invoked when a monitor 112 (discussed next) detects a condition to be satisfied or violated as specified by a rule. The specification 108 is compiled/synthesized to build an executable monitor 112. Instances (copies) of the monitor 112 and application 110 may be distributed in pairs to run concurrently on various hosts 102, or instances of the same monitor running on a host 102 may be used to observe the behavior of multiple applications running on that node or applications hosted inside VMs in the cloud service layer 104 on that node or the cloud infrastructure itself. Hosts 102 or VMs hosted on the host, may store a pair and execution thereof may be dynamically controlled (started/stopped) by the cloud infrastructure 100. Or, the cloud infrastructure may send instance pairs to hosts 102 where and when the cloud infrastructure deems them necessary. Instances of the application 110 are executed on top of the cloud service layer 104 in the cloud infrastructure 100. External users 114 use the application 110 via the cloud infrastructure 100. To external users, the application 110 appears as a virtual application 116, regardless of which hosts 102 are running the application 110. The cloud infrastructure 100 presents the application 110 and hides details about which hosts 102 are running the application, handles host and/or application failures, manages load balancing, administrative maintenance, and so on.

The cloud infrastructure 100 may perform additional functions. For instance, the cloud infrastructure 100 may control which hosts thereof host the application 110 and its monitor 112. The cloud infrastructure may ensure that an instance of the monitor 112 is always paired/concurrently running with the application 110 on any host where the cloud infrastructure 100 has determined should host the application 110. The cloud infrastructure 100, data center, or the like, may perform load-balancing or health-monitoring to determine which hosts should have the application 110 running thereon, and when the cloud infrastructure 100 consequently causes the application 110 to run (e.g., by installation, by providing an interrupt or activation signal, by executing the application 110, etc.) on a host, the cloud infrastructure may also cause the monitor 112 (which is tailored to the specification 108) to concurrently run along-with the executing application, and in the same VM in case of a virtualized environment in the cloud service layer 104 on the same host. The cloud infrastructure may also cause an instance of the monitor 112 to concurrently run along-with the operating system kernel or the hypervisor/VMM (virtual machine manager) to observe the execution of all running applications or VMs, respectively, on a given host 102.

Regarding an application specification, a developer may specify desired properties using predicate logic (e.g., "<", "< >", "OR", etc.) on runtime application behavior traits (e.g., outgoing traffic rate) and runtime properties and characteristics of the cloud computing infrastructure (e.g., network bandwidth) in a specification/policy language, which may be a declarative language (e.g., XML), a markup style language, or a procedural language (e.g., C# and LINQ), etc. A cloud operator may specify properties relating to application execution on hosts (e.g., power usage). The specification/policy language treats different applications, cloud network and hosts in generic terms. Thus, one authoring a specification may do so without having to understand the implementation of the application or making any changes to the application. Instead, the application may be treated as a black box and properties may be expressed based on externally observable behavior of the application e.g., resource footprint, request rate, etc. In case the application exports its internal state or performance counters to be observed externally, these properties may also be included in the conditions as part of the specification.

Regarding compilation of a monitor, the predicates in a specification are compiled to synthesize/build a corresponding runtime observer or monitor by translating the specification into executable code and integrating the monitor with user-defined actions for deployment along with application instances. When on any given host or VM the monitor code is executed at runtime, it continually checks the conditions described in the specification against observed properties and characteristics of the application and the cloud computing infrastructure 100. On detecting a condition to be satisfied or violated, the monitor application instance triggers the specified user-defined action such as reporting an error to the developer and cloud operator, logging a message to storage, and executing a recovery code to enforce desired application and system behavior, etc. After instantiating these monitors, the monitor instances inter-communicate and cooperate to form a distributed monitoring service that aggregates global state obtained by monitors across the system, thereby allowing evaluation of global properties to check for violations of runtime properties and characteristics from specification (e.g., global network usage of an application exceeding a specified threshold). As described in detail below, monitors may cooperate and share/accumulate data by forming a distributed hash table (DHT) overlay, a type of peer-to-peer network.

Regarding recovery and enforcement, when a violation is detected, a user-defined handler may be called to trigger actions such as error notification and logging, application recovery, etc., by using recovery actions and enforcement modules on the hosts. A host may have one recovery action or enforcement module to handle all application-monitor pairs, or a host may have application-specific recovery actions and enforcement modules. Monitors, recovery actions, and enforcement modules may operate in the user-space where possible, or in the host kernel-space (e.g., in a hypervisor in the cloud service layer 104 or OS) where permissible.

Regarding when a violation is detected, the violation may be inserted in an event queue or interrupt buffer and the insertion may be performed according to different criteria e.g., based on violation priority. In parallel, a separate task process may dequeue the events from this event queue and call the associated recovery handler or enforcement action.

In a typical cloud environment, different applications will each have their own monitor. Thus, a given host might run application A with monitor A, and at the same time run application B with monitor B. That is, it will be expected that the building and distribution of a monitor application may be repeated or done independently for many different applications being hosted in a cloud environment.

Policy Specification Language

Figure 2:
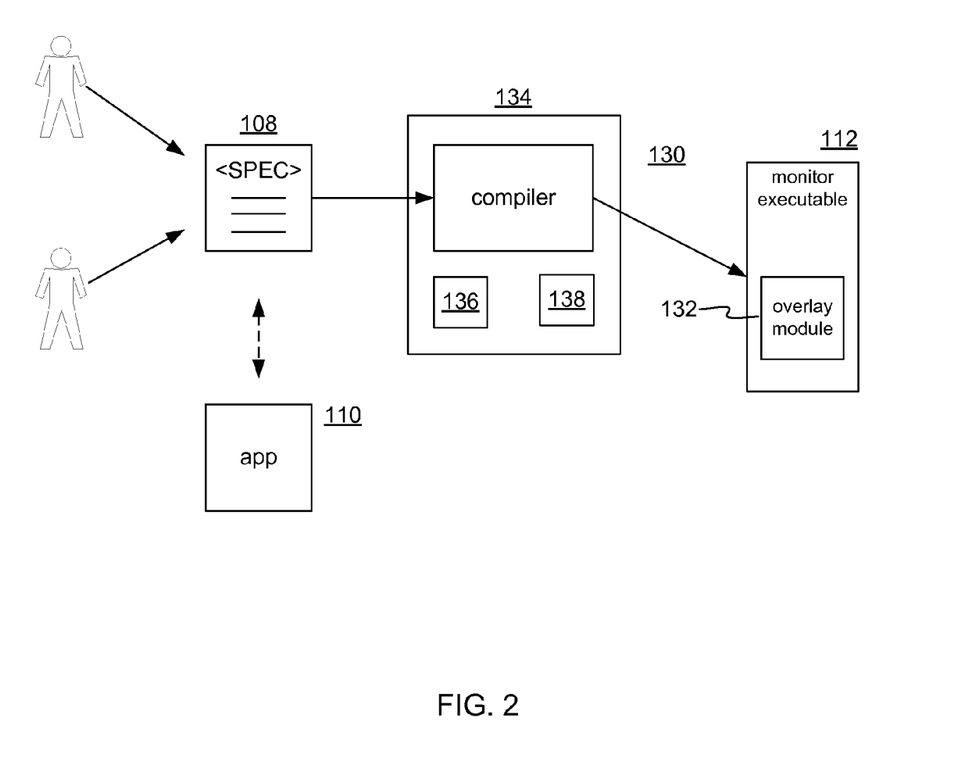
FIG. 2 shows a process for building a monitor.

FIG. 2 shows a process for building a monitor 112. A compiler 130 may implement a policy language. The compiler 130, hosted on a computer 134 having memory/storage 136 and processor(s) 138, receives specification 108, authored by a developer and/or a cloud administrator in the policy language. The compiler produces a monitor 112; an executable for a specific host, a program in source code to be executed by a runtime-interpreter on a host (e.g., a script), etc. The compiler 130 may also link in or otherwise include standard functionality to be included in most monitors, for instance, an overlay module 132 to handle DHT overlay functions, administrative functions, etc.

The policy language allows users and cloud administrators to express application-level and system-level properties that are to be checked during execution of the application. Various declarative, mark-up and procedural languages for expressing configuration, properties, rules, etc., are known and may be adapted to form the policy language. Preferably, the policy language is expressive and flexible enough to allow specification of different properties and their relationships, while at the same time the policy language is simple and easy-to-understand. Examples described below will illustrate a possible policy language implementation that involves two key constructs: sensors and rules.

A sensor construct defines a software measurement interface that outputs the value of a property (e.g., CPU utilization, network delay, power usage) and exports these observations as attribute tuples for runtime checking of property specification. A rule defines a predicate on one or more sensor outputs, and may be expressed as an invariant on combinations of multiple properties that must hold for each instance or for any arbitrary subset of nodes in the system (e.g., total outgoing traffic rate of a distributed application should not exceed 100 Mbps). Examples of each of these constructs will be presented, including examples of real-world policies. Additional details are included in a separate section.

Sensor constructs specify the measurement of individual application, VM, host (node), and cloud infrastructure properties that are to be monitored at runtime. Given a sensor specification, runtime observers or monitors are synthesized. A monitor can be or can include any active or passive measurement interface such as performance counters, network path monitors, bandwidth estimation tools, or counters exported by applications. These monitors may be concurrently run alongside application instances on the hosts in the cloud infrastructure, which may be in a data center, without affecting the functionality of the application instance(s) being observed To allow a particular sensor construct's output to be referenced in rules, each sensor construct may have a unique name or identifier. Sensor constructs may specify configuration parameters such as the frequency at which the sensor outputs measurement data, statistics on sensor outputs based on history (e.g., variance, quantiles, sliding window averages), conditional expressions to specifically measure the behavior of a specified set of applications, and specified enforcement actions. A specification may also include other properties or attributes such as a set of nodes, ports, protocols, IP addresses or combinations thereof, as well as statistics such as an average over a set of sensors. Others may include, but are not limited to: a performance counter for custom counters to be monitored; number of file handles used; IO read/write rates; page files; number of messages sent/received; number of processes; number of threads; network loss rate; availability of an IP address; average bandwidth use; etc. Three example types of sensor constructs will be described next.

PerformanceCounters—available through some APIs included with Microsoft Windows—may be used. Some PerformanceCounters export per-application and system-wide resource usage e.g., CPU, memory, I/O footprint, number of threads, etc. Note that equivalents are available on other types of operating systems, for instance HP SiteScope and /proc file system in Unix/Linux. Applications may also use the PerformanceCounter API or the like to expose measurements and properties of their internal state.

A network monitor sensor may be implemented based on Event Tracing for Windows (ETW), which is a logging facility provided with Microsoft Windows. Most operating systems have facilities for similar function. ETW provides a high speed, low overhead interface to measure fine-grained information about system properties such as per-application bandwidth. Because ETW allows monitoring kernel-level properties and network traffic, it requires administrative privileges. Thus, an implementation based on Microsoft Windows may be expected to have developers leverage PerformanceCounters while cloud operators may use ETW.

Sensor constructs based on active and passive network-level measurements may be implemented to infer path characteristics inside a data center, including network reachability metrics, round-trip times, loss rates, link availabilities, etc. Any variety of network measurement may be implemented to identify network bottlenecks or other network issues.

Application developers and cloud operators specify rules that check the runtime behavior and characteristics of application instances and the underlying cloud computing infrastructure hosting these applications, either individually or globally across the cloud. Rules may be expressed as complex predicates on sensor outputs to specify high-level, global properties of applications and the hosting cloud platform. Rules may be composed and concatenated using first order logic. A broad range of aggregation functions, such as SUM, AVG, TOP-K, APPEND, MAX, etc. may be provided to aggregate sensor data, and rules may reference these functions to specify application and cloud computing infrastructure behavior in the aggregate.

To control runtime behavior, user-defined actions may be defined to be triggered upon violation of rules. A violation/exception handler can be any user handling code that may send an alert to a user, log the violation for error diagnosis, terminate the application, suspend execution, perform error recovery, add new functionality, etc. Note that rules defined on properties of a single application instance may be checked by the monitor running along-side that instance. However, for rules defined on global state of an application as aggregated across the monitors, the monitors cooperate as a distributed monitoring system (using a DHT overlay) to stream the global state to a designated monitor. The designated monitor, to be referred to as a verifier, may be a designated one of the monitors, or a separate module on one of the hosts hosting an application instance. In the case where the verifier is one of the monitors, each aggregate rule may be assigned to a particular monitor/verifier by computing a verifier id as a hash of the rule. That is, rules may be mapped to monitors/verifiers, and any given monitor will know which monitor to forward rule data by computing a hash of the rule and using the hash to identify the correct target monitor. In another embodiment, one or more particular monitors are the designated verifier(s) for all aggregate rules. Monitoring system details are described further below.

Examples of specifications in a policy language will be described next. The examples, which include sensor constructs and rules, are implemented in XML and C#/LINQ. A specification in a policy language is preferably converted into an internal representation during compilation (i.e., a platform/language neutral pseudocode or intermediate language), which may provide flexibility to support other languages to facilitate policy specification for different users and environments. The following examples may be suitable for scenarios where it is likely that applications may: fill up disk space or use excessive CPU time; send large amounts of unsolicited network traffic to remote hosts; spawn a large number of zombie processes, etc. Issues related to load balancing across front-end servers and power usage of a set of servers may also be addressed.

Figure 3:
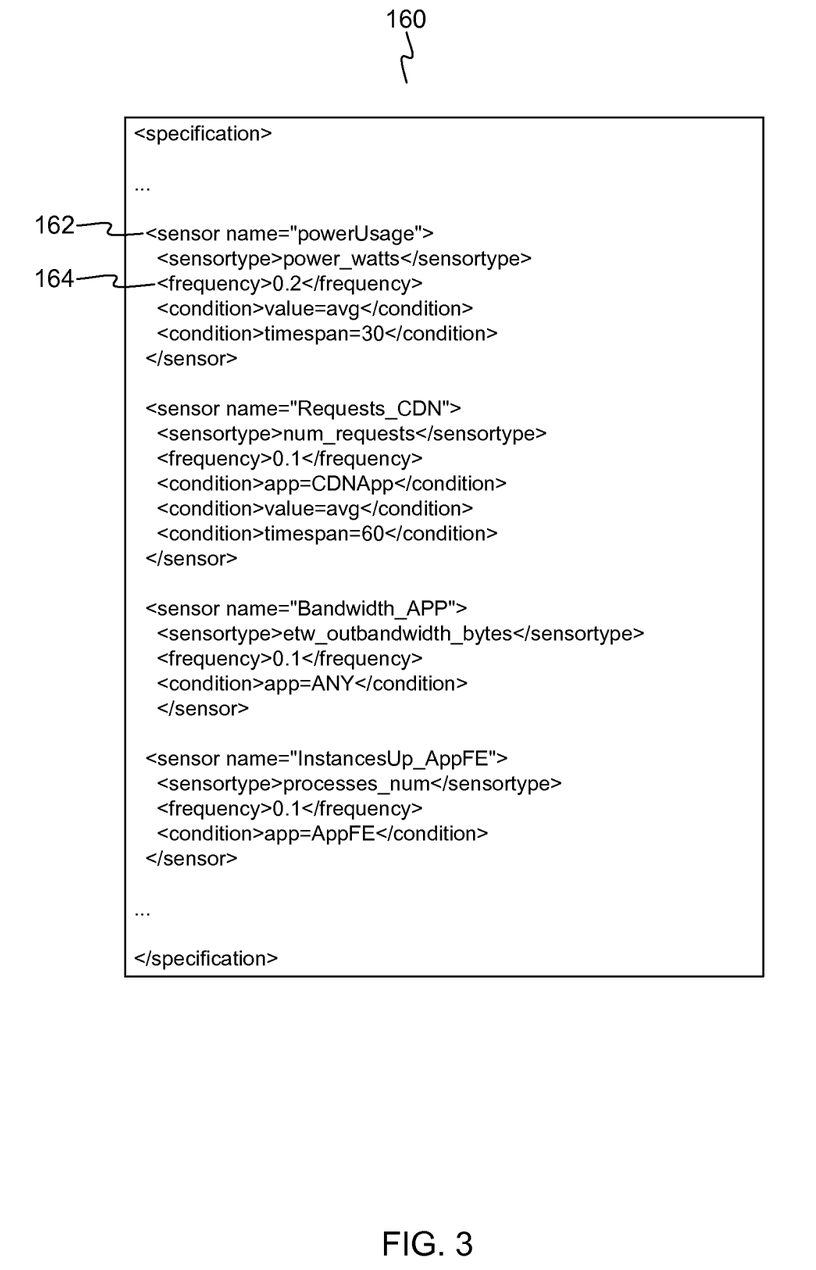
FIG. 3 shows an example partial specification.

FIG. 3 shows an example partial specification 160. Sensor constructs 162 are provided to configure a to-be-compiled monitor to monitor per-node power usage, request rate averaged over a 60 second window of application "CDNApp", individual bandwidth usage of each running application, and the number of running instances of application "AppFE". Each sensor specification 162 allows defining frequency 164 of sensor updates, e.g., 0.1 Hz.

Figure 4:
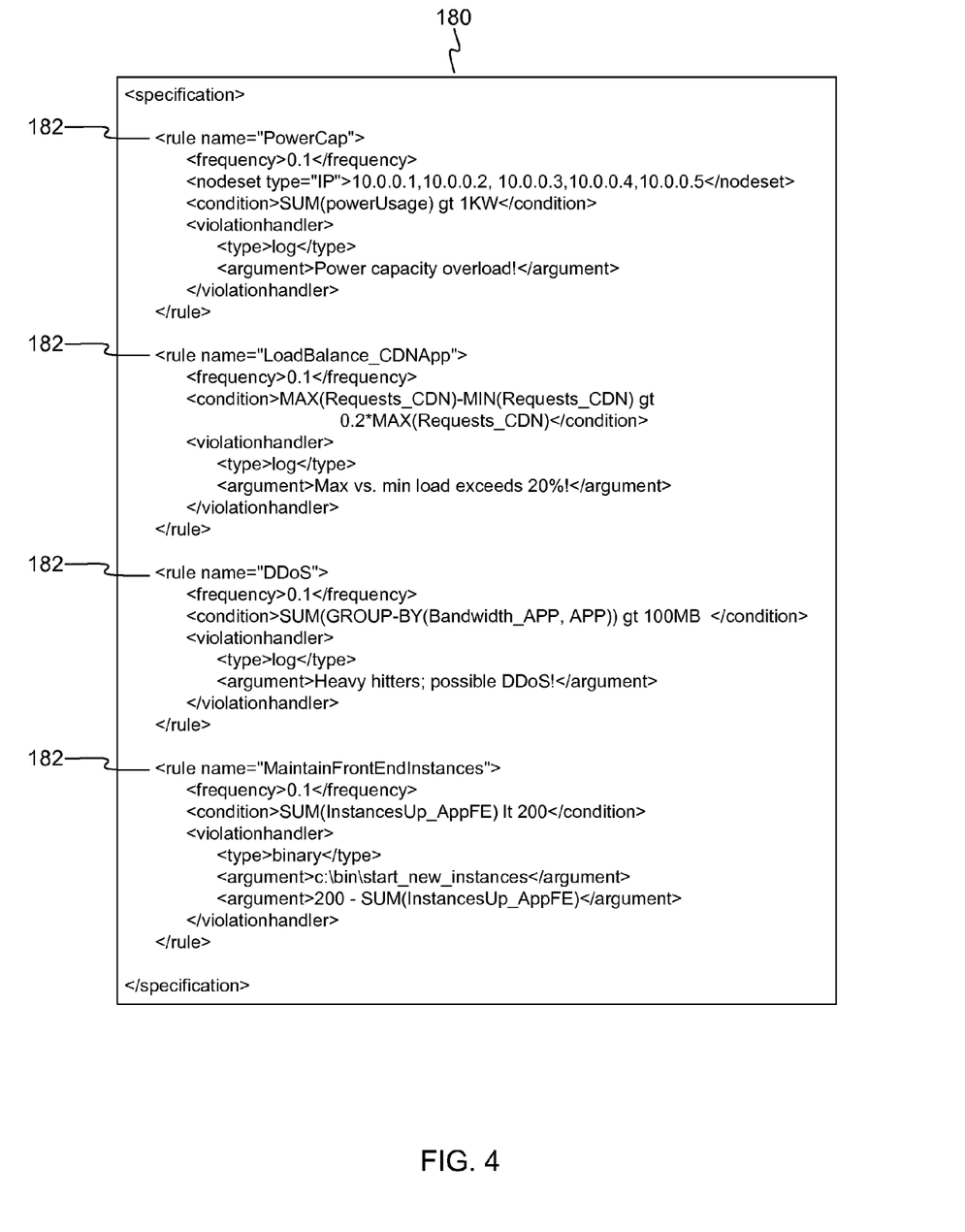
FIG. 4 shows an example application specification with example rules to detect several problems in data centers.

FIG. 4 shows an example application specification 180 with example rules 182 to detect several problems in data centers. The rule "PowerCap" specifies that the total energy used by five servers (say, hosted in the same rack), identified by their IP addresses, to be below 1 KW power budget. The rule "LoadBalance_CDNApp" specifies detecting load imbalancing by comparing the maximum and minimum request rates across all servers. The "DDoS" rule tests whether any hosted application is sending more than 100 MB of aggregate traffic over a 10 second window. To maintain a minimum number of front-end servers, the rule "MaintainFrontEndInstances" ensures that at least 200 front-end instances are running. On violation of this condition, the violation handler gets triggered, which executes a user-specified executable to instantiate the requisite number of new front-ends.

Figure 5:
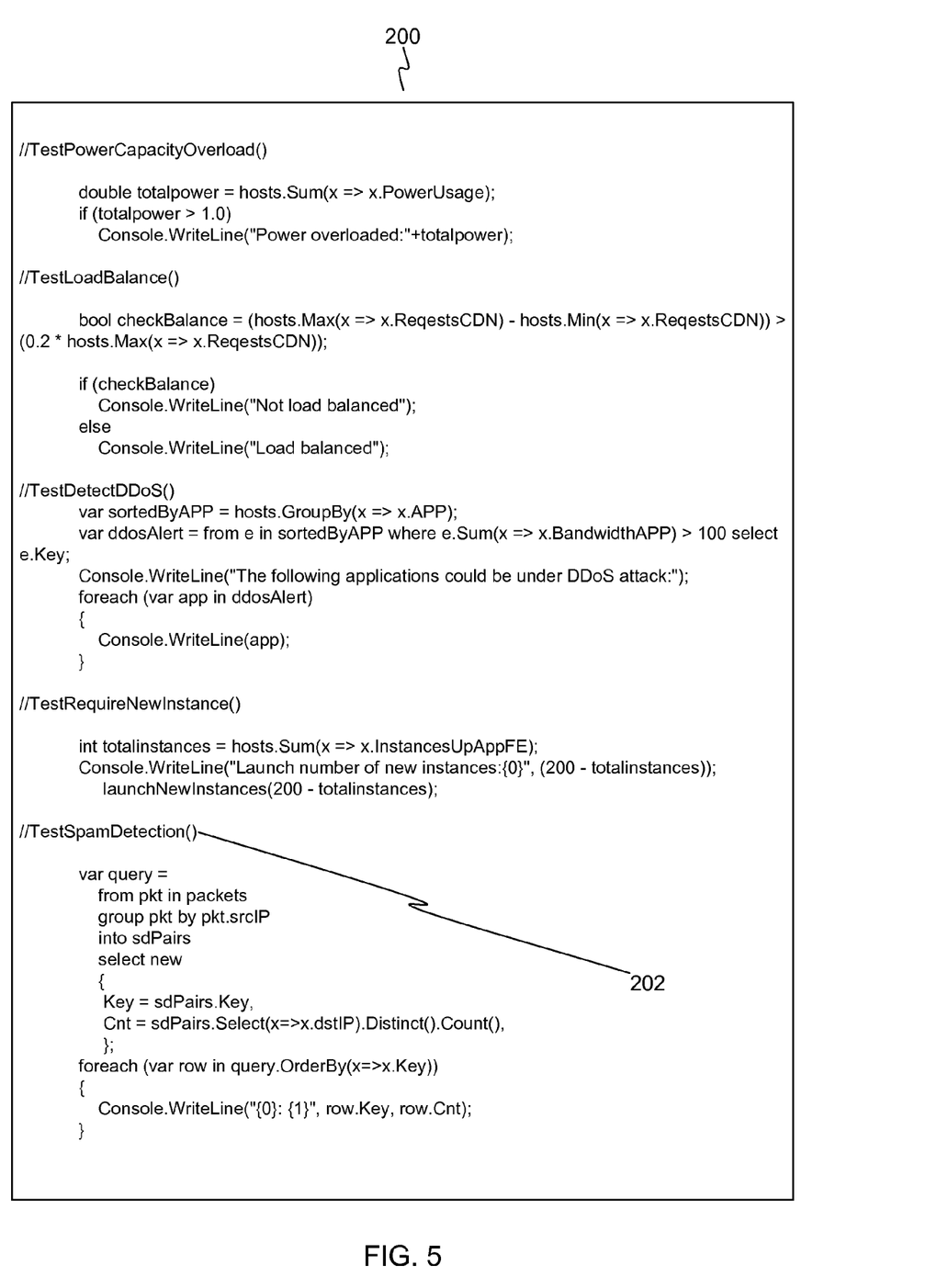
FIG. 5 shows a sample specification with an example rule to specify spam detection.

FIG. 5 shows a sample specification 200 with an example rule 202 using LINQ to specify spam detection (among other example rules). Here, the unique IP addresses contacted by a node are counted and outputted according to their precedence.

While several rules described above simply log an error message on detection of a policy/rule violation, a broad range of violation handlers are possible. Specifically, recovery handlers and enforcement mechanisms may be provided to enable application-specific and cloud infrastructure-specific policies to enforce desired application behavior and cloud infrastructure behavior, respectively. These are discussed in detail below.

Scalable Monitoring System

Figure 6:
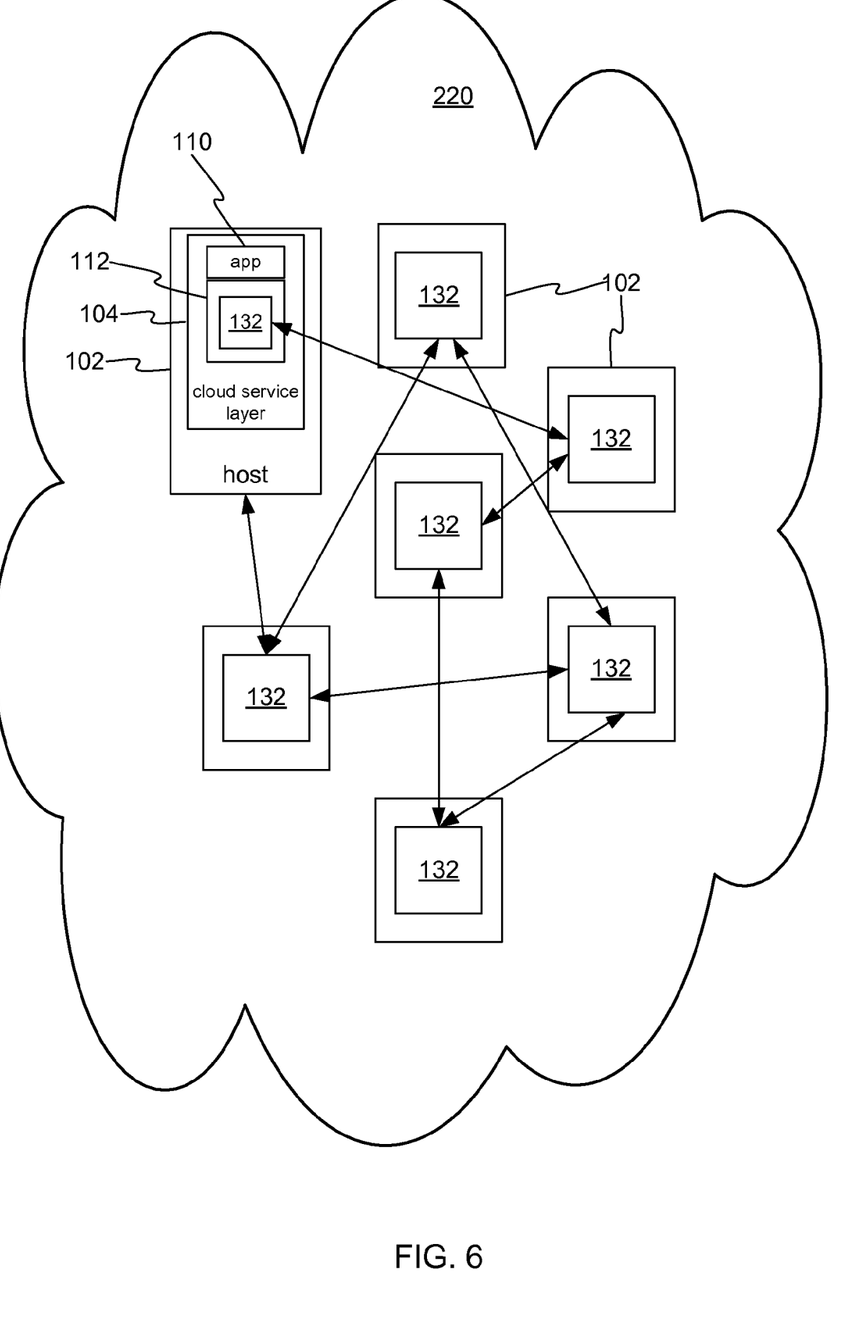
FIG. 6 shows a scalable peer-to-peer overlay for the monitoring system.

FIG. 6 shows a scalable monitoring system 220. A scalable monitoring system 220 may be used to aggregate global state exposed by monitor instances running along-side application instances. Although a centralized monitoring system may be used where monitor application instances may provide their local data for aggregation and checking of specified properties, it may be helpful to implement application monitoring in a way (i) that scales to large numbers of servers (typically, tens to hundreds of thousands of nodes) and applications (few hundreds to thousands) hosted in data centers or cloud infrastructures, (ii) that incurs minimal overhead to deliver results in real-time, and (iii) that is robust to node and network failures.

To build a scalable monitoring system, a distributed, peer-to-peer (P2P) approach may be used to aggregate global system state, without the need for (or supplemental to) centralized monitoring. While a centralized approach is simple, it may limit scalability. In contrast, a P2P implementation is scalable, self-organizing, robust, and bandwidth efficient. Known aggregation techniques may be used such as DHT-based hierarchical aggregation, arithmetic filtering and temporal batching.

Figure 7:
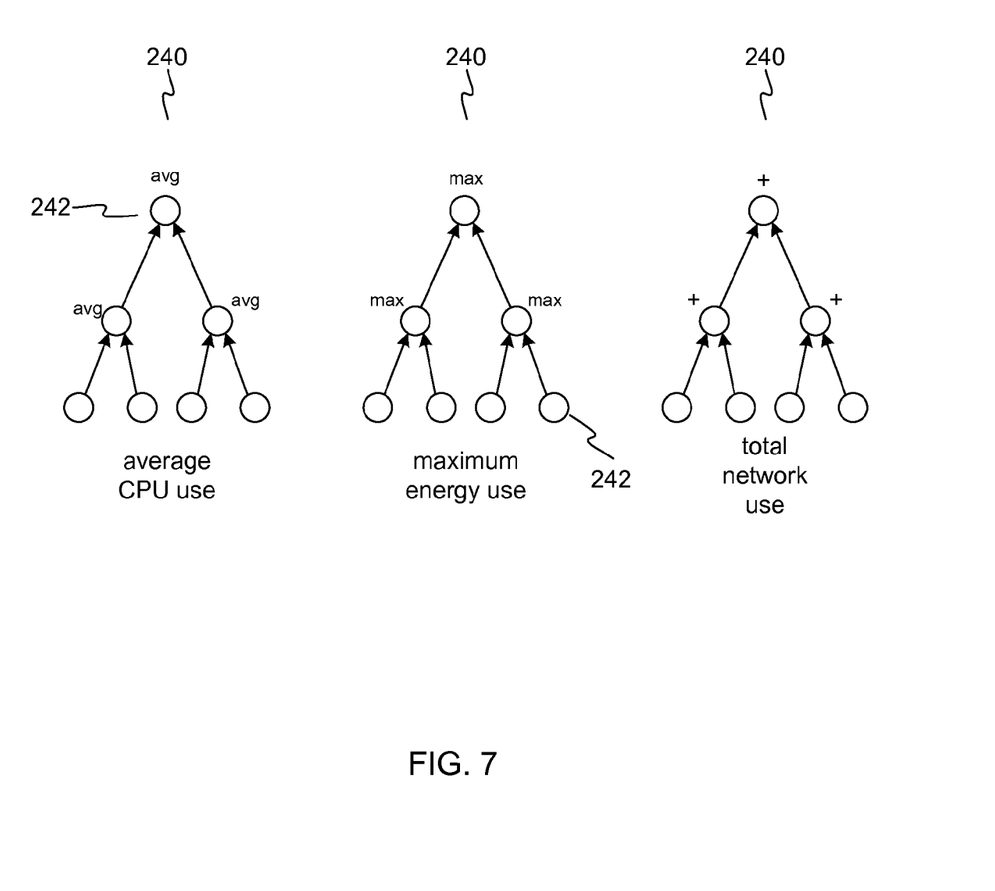
FIG. 7 shows example multicast trees for aggregating average CPU use, maximum energy use, and total network use.

Distributed information planes may use a mesh structure built on top of a Gossip protocol, or a tree structure built on top of a structured overlay. In FIG. 6, overlay modules 132, each running on a different host, either as a separate dedicated application or as part of the monitor executing on a host, form a P2P overlay. Each monitor or overlay module 132 is able to address (in P2P address space) any other monitor or overlay module 132. The scalable monitoring system 220 may allow monitor instances to build multicast trees for aggregating data. FIG. 7 shows example multicast trees 240 for aggregating average CPU use, maximum energy use, and total network use. Each node 242 in FIG. 7 may represent a separate instance of a monitor running on a host.

Given that data center environments tend to be stable, have a fixed-topology network with high bandwidth, and low-latency links, it is possible to use a tree-based information plane. Such an information plane may be implemented using Distributed Routing Tables (DRT), a key-based routing primitive (such as the Pastry-like DRT supplied with Windows 7). Pastry and derivatives thereof are well-known overlays whose description is readily available elsewhere. A DRT assigns a unique ID in a circular address space to each node (host/monitor) and provides routing paths of expected length O(log n) in a network of n nodes. On top of a DRT, the Scribe algorithm may be used to construct multiple aggregation trees. For description of Scribe, see Castro et al., "Scribe: A large-scale and decentralized application-level multicast infrastructure", IEEE journal On Selected Areas In Communications, Vol. 20, No. 8, October 2002. In Scribe, each tree is identified by a unique ID that maps into the overlay's address space. The root of a tree is the node with the ID closest to and preceding the ID of the tree in the circular address space. A node joining the tree sends a join message to the node with the address, thus halving the distance to the root of the tree. By doing so, the tree maintains an expected height of O(log n). The distance to the next hop in the tree may be configured to allow denser or sparser trees.

To aggregate global state, monitors deployed with each application instance may expose their state as attribute tuples which are propagated as updates in the aggregation trees. A single tree per attribute (e.g., CPU usage of cloudApp application) may be used to send multiple aggregates (e.g., SUM, TOP-K) on that attribute along the same tree. This allows the combination of multiple, related updates into a single message thereby reducing bandwidth cost. To further reduce the aggregation overhead, scalability techniques such as arithmetic filtering may be used, which caches recent updates and sends a new update when its value differs by some threshold (e.g., 5%) from the cached value. Temporal batching may be used to combine multiple updates that arrive close in time into a single update. To expose network disruptions, an active probing/acknowledgment mechanism may be implemented in the information plane to flag reports as stale if no updates are received until a timeout. For WAN deployments, e.g., geographically distributed applications hosted in multiple data centers or applications running in highly distributed environments like PlanetLab, a distributed testbed comprising 800 computers spread throughout the globe, monitoring techniques may be implemented that safeguard and may improve accuracy of results despite failures and delays. See N. Jain, D. Kit, P. Mahajan, P. Yalagandula, M. Dahlin, and Y. Zhang, "Network Imprecision: A New Consistency Metric for Scalable Monitoring", in OSDI, 2008.

Recovery Handlers and Enforcement Modules

When a monitor detects a violation of a property specification at runtime, this may trigger the execution of a violation handler to control runtime behavior of the corresponding application and of the cloud computing infrastructure. To achieve this functionality, the mechanism of enforcement may be separated from application-specific policy, allowing users to specify any application-specific technique to enforce desired application behavior. For example, a user may choose to terminate the application, log error information for diagnosis, use existing system mechanisms (e.g., adjust CPU time allocated to a Virtual Machine), or use techniques provided by the application itself (e.g., a recovery process called by an exception handler provided by the application) to control the application's behavior and resource consumption. Similarly, violation handlers may be specified to control the behavior of the cloud infrastructure e.g., on detecting a high input request rate or load imbalance of user requests, the infrastructure may bring online additional F5/F6 load balancers to handle the load.

Regarding violation handlers, a standard library of predefined actions may be built. Such a library may include different types of recovery actions and enforcement modules providing different functionality, including, logging to a database, sending notification alerts, modifying application execution at runtime, analyzing runtime data and stack of application execution, terminating application, invocation of an alternate service, debugging the application execution state, task scheduling, and triggering actions for rollback and compensation.

An example enforcement scheme for network-level enforcement will be explained next. A network enforcement module (NEM) may be provided to enforce network-level runtime properties of a distributed application, with focus on global outgoing bandwidth per application and on access control.

In distributed environments the network constraints mentioned above may be specified on a per-node basis. For example, to limit excessive outgoing traffic, PlanetLab caps the total bandwidth transmission of an application to 10.8 GB per node per day. This approach has two drawbacks. First, as the number of application nodes increases, the low per-node bandwidth rate may still aggregate across nodes to generate a high traffic volume, e.g., to launch DDoS attacks. Second, many applications comprise heterogeneous instances with different traffic characteristics, e.g., in multi-tier web services, the front-end may need to send large-payload responses to end-users, while middle-tier application servers may generate relatively small amounts of traffic. Therefore, capping each node to the same bandwidth limit results in insufficient resources at high-utilization nodes while wasting resources at low-utilization nodes.

Figure 8:
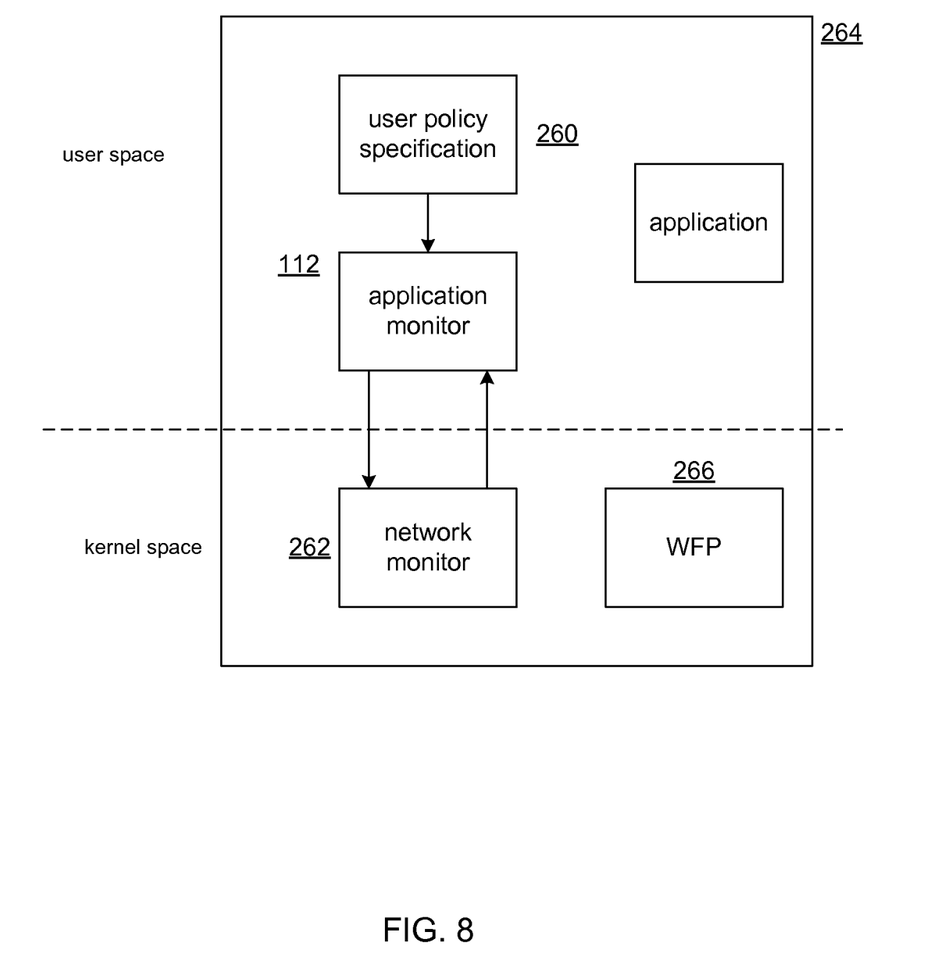
FIG. 8 shows an embodiment of a network enforcement scheme.

FIG. 8 shows an embodiment of a network enforcement scheme based on Microsoft Windows Filtering Platform (WFP), which may be used to address the network characteristics mentioned above. This embodiment may use a simple bandwidth allocation policy 260 based on weighted max-min fairness and implemented by the NEM as a network monitor 262, which may be a kernel driver on a host 264 that uses the Microsoft Windows Filtering Platform (WFP) 266. WFP is a set of Windows system services and user-mode and kernel-mode APIs that enable programmers to develop firewalls and other connection-monitoring or packet-processing software. Using WFP to implement NEM allows a programmatic way to trap outgoing/incoming packets and consult a policy engine in user space to execute user-specific logic for each packet, e.g., allow/disallow packets, meta-data bookkeeping, etc. An operator may specify the desired property as an upper bound on the aggregate traffic volume per application. The application monitor continuously checks the network monitor 262 to detect a violation, and on violation, triggers the bandwidth allocation policy to compute per-node caps. These caps are then dynamically configured in a user-space process which is consulted by the WFP driver (network monitor 262) before sending each outgoing packet for an application. If the outgoing bandwidth of an application across all its running instances exceeds specified bounds, the application monitor configures the network monitor 262 (NEM) to trigger rate limiting by queuing or dropping subsequent application packets. New network connections may still be allowed, because ignoring them might result in application logic mistaking origin/destination nodes as having failed.

Similarly, to implement access control, a user-space security policy is specified in terms of a white-list of external nodes that an application instance may communicate with. Before sending or receiving each packet, network monitor 262 (NEM) consults the white list in the user policy engine, which may be cached in the network monitor for optimization. Note that in this framework, the network monitor 262 (NEM) need not be exposed to the application logic details such as connection tracking, traffic bursts, or rate limiting; those details are handled by the user-defined policy.

CONCLUSION

Embodiments and features discussed above can be realized in the form of information stored in volatile or non-volatile computer or device readable media. This is deemed to include at least media such as optical storage (e.g., CD-ROM), magnetic media, flash ROM, or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as RAM and/or virtual memory storing information such as CPU instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A computer-implemented method of managing applications hosted in a cloud computing environment, where application instances, comprising instances of the same application, execute on different respective hosts in the cloud computing environment, the method comprising:

distributing, to each of the hosts, to concurrently execute with each application instance a corresponding monitor application instance, such that each application instance on a given host is paired with a monitor application instance on the given host in the cloud computing environment, the monitor application comprising an application that was generated from a specification of runtime properties and characteristics of the application and the cloud computing infrastructure, the specification defining properties of the application and the cloud computing infrastructure that are to be monitored and rules based on the properties and characteristics, each rule comprising one or more conditions, and wherein one of the properties comprise an aggregate property of the application;

executing each paired application instance and monitor instance on a different host in the cloud computing environment, wherein the cloud computing environment provides access to the application instances to users outside the cloud computing infrastructure;

each monitor application concurrently running on a host with an application instance monitors execution of the corresponding application instance, by obtaining from the host information regarding usage of resources on the host by the application instance, runtime properties, characteristics and performance metrics of the cloud computing infrastructure, and properties and performance metrics exported by that application instance and other application instances sharing common resources on the host;

each of the monitor applications using the host information to repeatedly determine whether a rule condition in the specification has been satisfied; and collecting corresponding values of the aggregate properties from the monitor instances and determining whether a condition of a rule in the application specification is satisfied by an aggregation of the collected values.

2. A computer-implemented method according to claim 1, wherein the collecting is performed using a distributed overlay network formed by the monitor application instances, each monitor application instance comprising a node in the distributed overlay network.

3. A computer-implemented method according to claim 2, wherein one or more of the applications run in virtual machines on respective of the hosts.

4. A computer-implemented method according to claim 1, wherein a rule includes a frequency that controls how often each monitor application instance will determine whether the condition of the rule has been satisfied, and a property includes one or more of: a frequency that controls how often each monitor application will obtain from its host a value of resource usage on the host, a target set of nodes or ports or protocols or IP addresses or combinations thereof, an aggregate over a set of output values from sensors, a number of file handles used, IO read/write rates, a page files, number of processes, number of threads, network loss rate, availability of an IP address, number of messages sent/received, average bandwidth used, or a runtime property and characteristic of the cloud computing infrastructure.

5. A computer-implemented method according to claim 1, wherein the collecting is performed using a centralized monitoring system where monitor application instances may provide their local data for aggregation and checking of specified properties.

6. A computer-implemented method according to claim 1, wherein a rule in the application specification comprises indicia of a violation handler, and each monitor instance invokes the violation handler on its host when the condition of the rule is satisfied on that host.

7. A computer-implemented method according to claim 1, wherein the application specification is written in a specification language, and generating of the monitor comprises passing the application specification to a compiler that is able to compile any arbitrary specification written in the specification language into a corresponding executable application.

8. One or more computer-readable storage memory devices storing information to enable host computers in a cloud computing network to perform a process, wherein the computer-readable storage media is not a signal, wherein host computers of the cloud computing network host arbitrary applications of various users by distributing the arbitrary applications among the host computers, the host computers provided with connectivity by a data network, the process comprising:

executing a plurality of application instances on respective host computers in the cloud computing network, each application instance comprising a copy of a same application program, where users access the application instances on the host computers via the cloud computing network, the cloud computing network providing access to the application instances by the users via the cloud computing network;

executing a plurality of monitor instances, one on each of the host computers hosting the application instances, respectively, wherein on any given of the host computers hosting a given monitor instance and given application instance, the monitor instance monitors effects of execution of the given application instance on the given host computer, each of the monitor instances comprising an instance of a same program compiled from a same specification that describes different types of runtime properties or characteristics of an element and/or aggregations thereof, the element comprising a component of the cloud computing network including the data network and/or the host computers and/or the application program; and obtaining, by the application monitor instances, values of the properties and characteristics, and transmitting indicia of the values.

9. One or more computer-readable storage memory devices according to claim 8, wherein a plurality of monitor instances corresponding to all or the subset of the executing application instances obtain values of an aggregate property on the host computers where they are executing, and monitor instances in the plurality form a peer-to-peer network where each monitor instance is able to communicate with other monitor instances and using the peer-to-peer network to forward the values to a particular monitor instance.

10. One or more computer-readable storage memory devices according to claim 9, wherein the particular monitor instance receives the forwarded values and repeatedly computes an aggregate value of the forwarded values, and wherein the specification further comprises a rule comprising a condition that includes the aggregate property, and the particular monitor instance monitors the rule by repeatedly checking whether the condition is met based on the computed aggregate values.

11. One or more computer-readable storage memory devices according to claim 8, wherein information on the values is collected at a centralized monitoring system where monitor application instances may provide their local data for aggregation and checking of specified properties at global scale.

12. One or more computer-readable storage memory devices according to claim 8, wherein the specification also describes recovery and/or enforcement actions to be taken when respective rules are satisfied or violated by values of local properties or aggregate properties obtained by monitor instances according to the specification.

13. One or more computer-readable storage memory devices according to claim 12, wherein a monitor instance running on a host computer repeatedly obtains values of the local properties from the host computer or aggregate values of the local properties across multiple host computers, and when the values indicate that a rule is violated, the host computer performs a recovery and/or enforcement action corresponding to the violated rule.

14. A method performed in a cloud computing infrastructure that includes host computers that host different applications, the cloud computing infrastructure managing which host computers host instances of which of the applications, the cloud computing infrastructure providing users with uniform access to the applications, the method comprising:

receiving a monitor application, the monitor application having been compiled by a compiler compiling a specification, where the compiler implements a specification language that provides a sensor construct that includes a sensor type field and a frequency field, and a plurality of sensor types for the sensor construct, each sensor type corresponding to a generic network usage property or a generic computation usage property, the specification corresponding to an application and/or the cloud computing infrastructure, the specification comprising text conforming to the specification language, the specification comprising a particular sensor construct describing identifying a particular one of the sensor types or an aggregation, wherein when the compiler compiles the specification to generate the monitor application it builds the monitor application according to the specification such that the monitor application, when executed, will periodically query any host computer on which it is running for values corresponding to the sensor type identified in the specification; and distributing instances of the application corresponding to the specification into the cloud computing infrastructure, the distributing comprising determining which host computers should host the application, and assuring that any host computer hosting the application is also provided with an instance of the monitor application, wherein the monitor application obtains, from whichever host computer it is running on, values of different properties including network resource usage or computation resource usage by the application on such host computer along-with runtime properties and characteristics of the cloud computing infrastructure.

15. A method according to claim 14, wherein the monitor application includes or has access to a peer-to-peer component on the host computer, wherein the specification further includes a second specific sensor construct comprising a second specific sensor type and an aggregate statistic for the second specific sensor type, the method further comprising the compiler responding to the presence of the aggregate statistic by building the monitor application such that instances of the monitor application will use the peer-to-peer components thereof to share and aggregate values for the second specific sensor type obtained from the respective host computers on which they are running.

16. A method according to claim 14, wherein the monitor applications transmit the obtained values to a given one of the monitor application instances, and the given one of the monitor application instances computes an aggregate statistic from the values, wherein the aggregate statistic is combined with another aggregate statistic to compute a final aggregate statistic.

17. A method according to claim 14, wherein the specification includes a rule, the monitor application is compiled to be able to test the rule, and the method further comprises determining, by the given one of the monitor applications, based on the aggregate statistic, whether the rule is violated.

18. A method according to claim 17, wherein the specification defines an action associated with the rule, the monitor application is compiled to be able to trigger the action, the method further comprising responding to a determination that the rule is violated by triggering, by the given one of the monitor application instances, the action.

19. A method according to claim 14, wherein the specification language further comprises a rule construct with a frequency element and violation handler element, and the specification comprises a specific rule construct that comprises a rule and references the specific set of sensor constructs, and the compiling further comprises building the monitor application according to the specific rule construct such that monitor application, when executed, will periodically determine whether the rule is satisfied or violated by the obtained sensor output values.

* * * * *